United States Patent
Racicot

(10) Patent No.: US 7,907,142 B2
(45) Date of Patent: Mar. 15, 2011

(54) VIDEO TILING USING MULTIPLE DIGITAL SIGNAL PROCESSORS

(75) Inventor: Marc Racicot, Laval (CA)

(73) Assignee: Verint Systems Inc., Santa Clara, CA (US)

( * ) Notice: Subject to any disclaimer, the term of this patent is extended or adjusted under 35 U.S.C. 154(b) by 664 days.

(21) Appl. No.: 12/014,155

(22) Filed: Jan. 15, 2008

(65) Prior Publication Data

US 2009/0179904 A1    Jul. 16, 2009

(51) Int. Cl.
*G06F 15/16*    (2006.01)
*G09G 5/00*    (2006.01)

(52) U.S. Cl. ........................ 345/502; 345/629
(58) Field of Classification Search .................. 345/1.3, 345/506, 629, 502

See application file for complete search history.

(56) References Cited

U.S. PATENT DOCUMENTS

| | | | |
|---|---|---|---|
| 5,940,051 A * | 8/1999 | Sala et al. | 345/55 |
| 6,340,957 B1 * | 1/2002 | Adler et al. | 345/1.3 |
| 6,795,076 B2 * | 9/2004 | Deering et al. | 345/502 |
| 6,924,807 B2 * | 8/2005 | Ebihara et al. | 345/503 |
| 7,456,836 B2 * | 11/2008 | Mamiya et al. | 345/505 |
| 7,808,447 B1 * | 10/2010 | Cook | 345/1.3 |
| 2002/0033828 A1 * | 3/2002 | Deering et al. | 345/502 |

* cited by examiner

*Primary Examiner* — Ryan R Yang

(57) ABSTRACT

A system and method for creating video tile arrays is disclosed. A first plurality of video streams produced by a first plurality of Analog to Digital Converters (ADCs) are received in a first Digital Signal Processor (DSP). The first DSP processes the first plurality of video streams to produce a partial video tile array stream. The partial video tile array stream is transferred to a second DSP. The second DSP receives a second plurality of video streams produced by a second plurality of video ADCs. The second DSP processes the partial video tile array stream and the second plurality of video streams to generate a tiled video stream. The tiled video stream comprises an array of a plurality of video tiles that each correspond to a one of the first and second plurality of video streams.

21 Claims, 4 Drawing Sheets

US 7,907,142 B2

VIDEO TILING USING MULTIPLE DIGITAL SIGNAL PROCESSORS

TECHNICAL FIELD

The invention is related to the field of video processing.

TECHNICAL BACKGROUND

Video tiling is the display of multiple scaled down videos on a single display. To create a tiled display, the multiple videos are each scaled and then placed into a tile location. Creating a tiled display may consume large amounts of resources. Because each image, or frame, of a video, needs to be scaled and placed, and a new image or field may arrive every $\frac{1}{60}^{th}$ of a second (or faster) dedicated analog circuits are often used to create a tiled display.

SUMMARY

A method of operating a video tiling system is disclosed. A first plurality of video streams produced by a first plurality of Analog to Digital Converters (ADCs) are received in a first Digital Signal Processor (DSP). The first DSP processes the first plurality of video streams to produce a partial video tile array stream. The partial video tile array stream is transferred to a second DSP. The second DSP receives a second plurality of video streams produced by a second plurality of ADCs. The second DSP processes the partial video tile array stream and the second plurality of video streams to generate a tiled video stream. The tiled video stream comprises an array of a plurality of video tiles that each correspond to a one of the first and second plurality of video streams. The tiled video stream is transferred to a Digital to Analog Converter (DAC). The output of the DAC drives an analog monitor to display the plurality of video tiles in a tile array.

A video processing system is disclosed. A first plurality of video ADCs converts a first plurality of analog video signals into a first plurality of digital video streams. A first DSP receives the first plurality of digital video streams and generates a partial video tile array stream. A second plurality of video ADCs converts a second plurality of analog video signals into a second plurality of digital video streams. A second DSP that receives the second plurality of digital video streams generates a tiled video stream.

The first plurality of video streams may be scaled down by the first DSP. The first DSP may arrange the scaled down videos in a partial video tile array. The partial video tile array may be sent to the second DSP as a partial video tile stream.

The second plurality of video streams may be scaled down by the second DSP. The second DSP may arrange the scaled down videos and a partial video tile array received from the first DSP into a tiled video. The tiled video may be displayed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-4 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
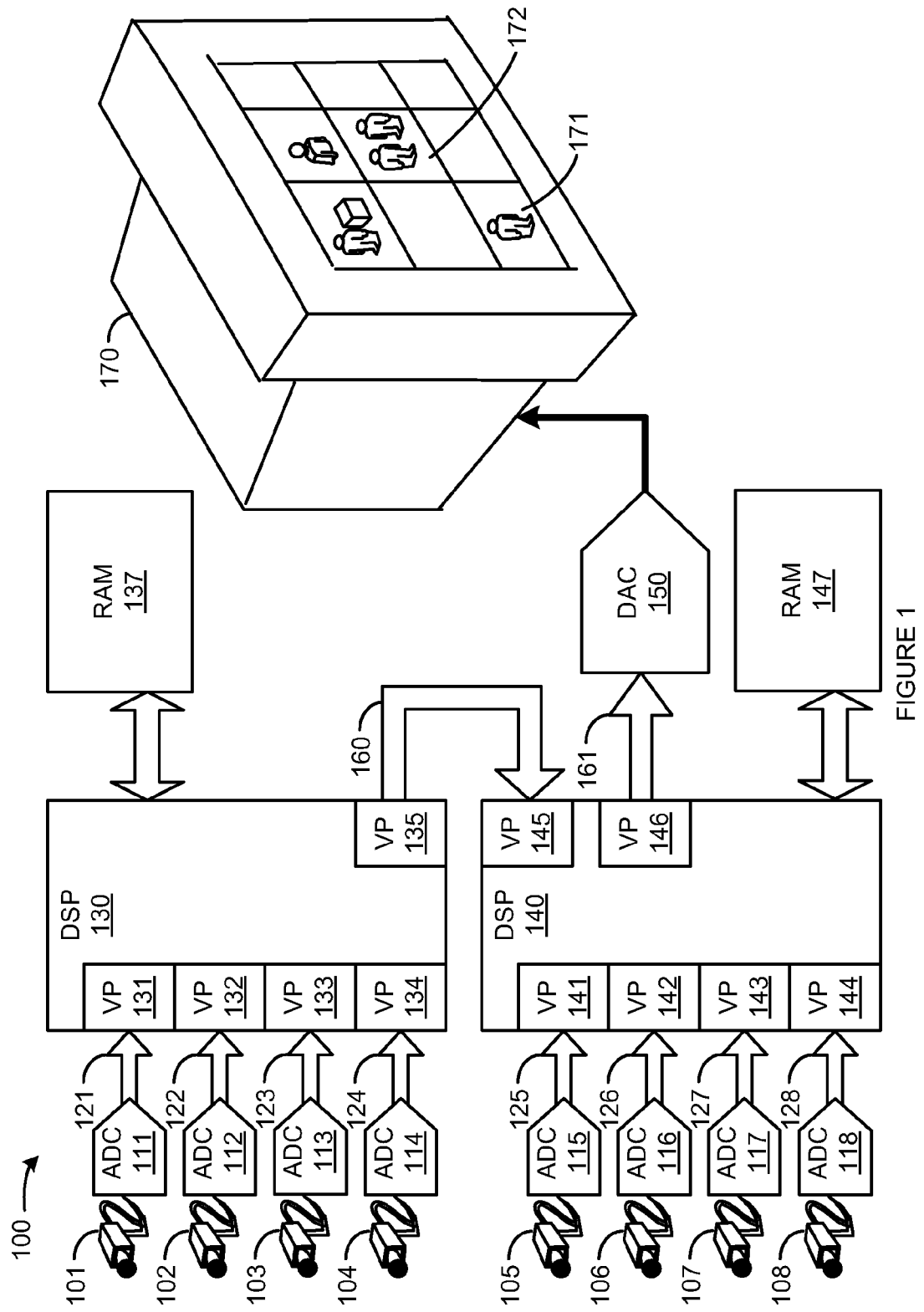
FIG. 1 is a block diagram illustrating a video tiling system.

FIG. 1 is a block diagram illustrating a video tiling system. In FIG. 1, video tiling system 100 comprises: analog video sources 101-108; video ADCs 111-118; video data streams 121-128; DSP 130; DSP 140, Random Access Memory (RAM) 137; RAM 147; DAC 150; partial video tile array stream 160; tiled video stream 161; display 170; and video tiles 171 and 172. DSP 130 includes Video Peripherals (VPs) 131-135. DSP 140 includes VPs 141-146. DSPs 130 or 140 may be a TMS320DM647 or TMS320DM648 digital media processor available from Texas Instruments™. DSP 130 and DSP 140 may be configured to receive multiple video data streams 121-124 and 125-128, respectively.

Four analog video sources 101-104 are operatively coupled to four video ADCs 111-114, respectively. Another four analog video sources 105-108 are operatively coupled to four video ADCs 115-118, respectively. Video ADCs 111-114 are operatively coupled to VPs 131-134, respectively. Video ADCs 115-118 are operatively coupled to VPs 141-144, respectively. VPs 131-134 receive video data streams 121-124 from video ADCs 111-114, respectively. VPs 141-144 receive video data streams 125-128 from video ADCs 115-118, respectively.

VP 135 is operatively coupled to VP 145. VP 145 receives partial video tile array stream 160 from VP 135. VP 146 is operatively coupled to DAC 150. DAC 150 receives tiled video stream 161 from VP 146. RAM 137 is operatively coupled to DSP 130. RAM 147 is operatively coupled to DSP 140. Thus, because VPs 131-135 are all part of DSP 130, VPs 131-135 are all operatively coupled to RAM 137 and DSP 140. Also, because VPs 141-146 are all part of DSP 140, VPs 141-146 are all operatively coupled to RAM 147 and DAC 150.

DAC 150 is operatively coupled to display 170. Display 170 is shown displaying a video tile array including video tiles 171 and 172.

Analog video sources 101-108 each produce an analog video signal. These analog video signals are converted to a digital format by video ADCs 111-118. The analog video signal produced by analog video source 101 is converted to a digital format by video ADC 111. The analog video signal produced by analog video source 102 is converted to a digital format by video ADC 112, and so on.

In an example, the digital format produced by video ADCs 111-118 may be specified by the International Telecommunication Union Radiocommunication Sector (ITU-R) BT.656. A BT.656 digital video data stream is a sequence of 8-bit or 10-bit bytes, typically transmitted at a rate of 27 Mbyte/s. The BT.656 video data streams 121-124 produced by video ADCs 111-114 are received by VPs 131-134, respectively. The BT.656 video data streams 125-128 produced by video ADCs 115-118 are received by VPs 141-144, respectively. Thus, DSP 130 receives four video data streams 121-124, and DSP 140 receives another four video data streams 125-128. To receive video data streams 121-128, the interfaces of VPs 131-134 and 141-144 may be clocked at 27 MHz to match the BT.656 data rate.

DSP 130 processes and stores data from video data streams 121-124 in RAM 137. In an example, DSP 130 processes data from video data streams 121-124 by removing blanking data from video data streams 121-124 before storing in RAM 137. In another example, DSP 130 processes data from video data streams 121-124 by storing each video data stream 121-124 in a different area of RAM 137.

DSP 130 generates a partial video tile array from video data streams 121-124. A partial video tile array is a video tile array that is only partially populated with scaled videos. For example, if a video tile array will consist of eight tiled videos populating eight of the nine spots in a 3×3 array, a partial video tile array may have only four tiled videos. The scaled video for four additional video tiles will need to be combined with this partial video tile array to make it a complete video tile array.

In an embodiment, DSP 130 generates a partial video tile array in RAM 137 by scaling one or more of video data streams 121-124 before storing video data streams 121-124 in RAM 137. In another embodiment, DSP 130 generates a partial video tile array by first storing unscaled versions of video data streams 121-124 in RAM 137. The unscaled versions of video data streams 121-124 are then scaled and stored in RAM 137. DSP 130 uses VP 135 to create partial video tile array stream 160 by transferring the partial video tile array stored from RAM 137 to VP 145. Partial video tile array stream 160 may be in BT.656 format.

DSP 140 generates a video tile array in RAM 147 from video data streams 125-128 and partial video tile array stream 160. Unpopulated tiles in the partial video tile array are populated with scaled versions of video data streams 125-128 to generate a complete video tile array. In an embodiment, the number of video data streams used to produce partial video tile array stream 160 is equal to the number of video data streams added by DSP 140 to create video tile array stream 161. In an embodiment, the number of video data streams used to produce partial video tile array stream 160 may be greater than the number of video data streams added by DSP 140 to create video tile array stream 161.

In an embodiment, DSP 140 generates a video tile array in RAM 147 by scaling one or more of video data streams 125-128 before combining these scaled versions with the partial video tile array received by VP 145. In another embodiment, DSP 140 generates a video tile array by first storing unscaled versions of video data streams 125-128 in RAM 147. The unscaled versions of video data streams 125-128 are then scaled and combined with a partial video tile array (already stored in RAM 147) as they are stored in RAM 147. DSP 140 uses VP 146 to create video tile array stream 161 by transferring the video tile array stored in RAM 147 to VP 146. Video tile array stream 161 may be in BT.656 format.

From the foregoing, it should be understood that DSPs 130 and 140 split the work of creating video tile stream 161. This allows DSP 130, DSP 140, or both to perform additional functions and/or processing on video streams 121-128.

DAC 150 receives video tile array stream 161 from VP 146. DAC 150 converts the digital video data stream signals into an analog video signal. DAC 150 is operatively coupled to display 170 to transfer this analog video signal to display 170. Display 170 displays the video tile array.

DSP 140 may also encode or otherwise process the video tile array. For example, DSP 140 may encode the video tile array and store the encoded version in RAM 147. For example, the video tile array may be encoded or compressed into a Moving Picture Experts Group (MPEG) specified format such as MPEG-4.

In another example, DSP 130 or DSP 140, or both processes one or more of video data streams 121-128 to perform video analytics. Video Analytics is a technology that is used to analyze video for specific data, behavior, objects or attitude. Examples of video analytics applications include: counting the number of pedestrians entering a door or geographic region, determining the location, speed and direction of travel, identifying suspicious movement of people or assets, license plate identification, face recognition, or evaluating how long a package has been left in an area.

Figure 2:
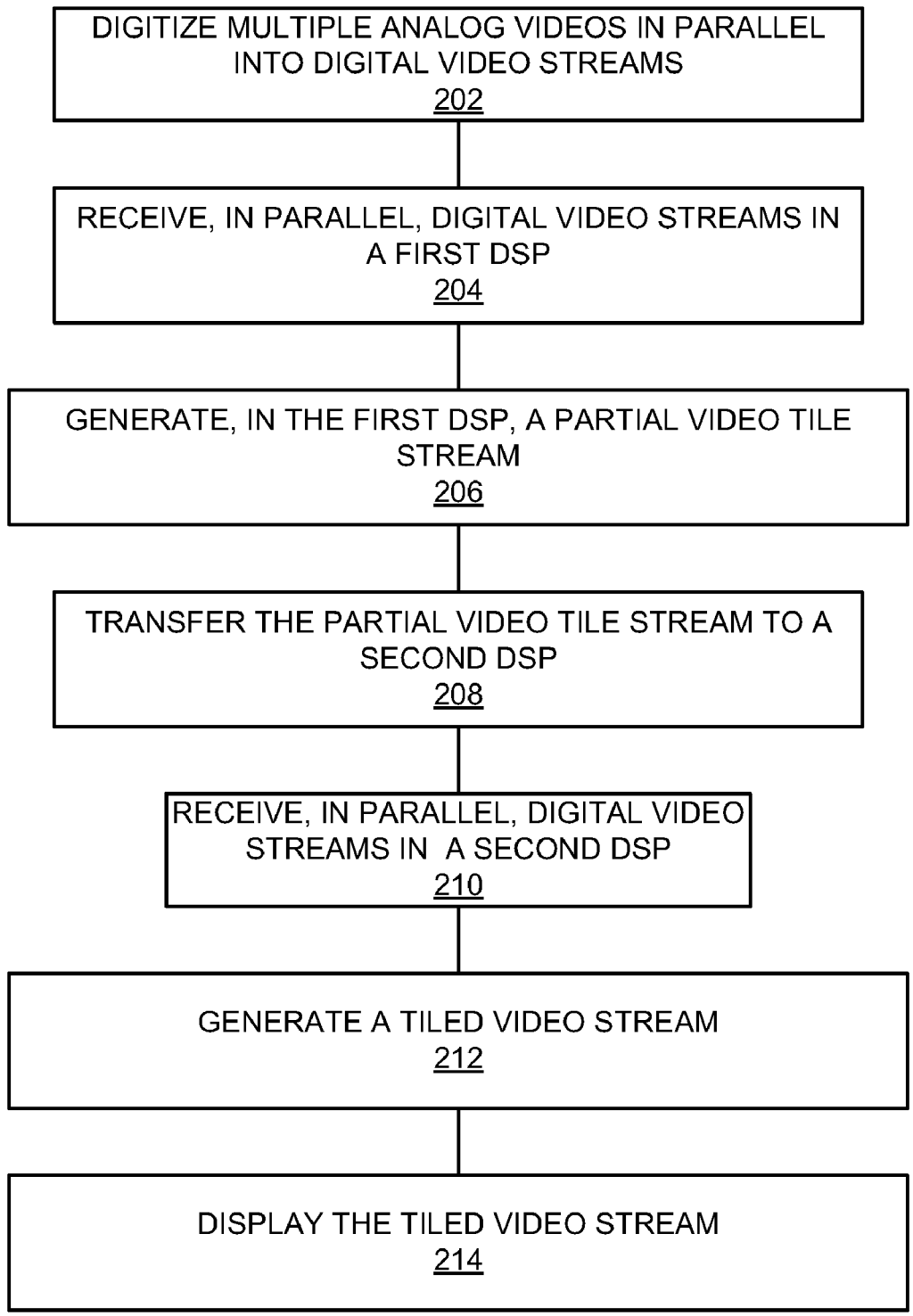
FIG. 2 is a flowchart illustrating a method of tiling videos.

FIG. 2 is a flowchart illustrating a method of tiling videos. The method of FIG. 2 may be performed by video tiling system 100. Multiple analog videos are digitized in parallel into multiple digital video streams (202). For example, video ADCs 111-118 generate video streams 121-128 in parallel. At least one of these digital video streams are received in parallel by a first DSP (204). For example, DSP 130 may receive video streams 121-124, but not video streams 125-128.

A partial video tile stream is generated by the first DSP (206). For example, DSP 130 may scale digital video streams 121-124 and store the scaled versions in RAM 137 to partially populate a video tile array. The partially populated video tile array may then be transferred from RAM 137 to VP 135 to generate a partial video tile stream 160.

The partial video tile stream is transferred to a second DSP (208). For example, VP 135 may send partial video tile array stream 160 to VP 145 which is part of DSP 140. Partial video tile array stream may be in BT.656 format.

At least one of these digital video streams generated in step 202 are received in parallel by a second DSP (210). For example, DSP 140 receives video streams 125-128 from video ADCs 115-118.

The video streams received by the second DSP are combined with the partial video tile array stream to generate a video tile stream (212). For example, DSP 140 may generate a video tile array in RAM 147 by scaling one or more of video data streams 125-128 before combining these scaled versions with a partial video tile array stream received by VP 145.

In another example, DSP 140 may generate a video tile array by first storing unscaled versions of video data streams 125-128 in RAM 147. The unscaled versions of video data streams 125-128 are then scaled and combined with a partial video tile array already stored in RAM 147. DSP 140 may use VP 146 to create a video tile array stream by transferring the video tile array stored in RAM 147 to VP 146. The video tile array stream may be in BT.656 format. In an embodiment, the number of video data streams used to populate partial video tile array stream 160 is equal to the number of video data streams added by DSP 140 to create video tile array stream 161. In an embodiment, the number of video data streams used to populate partial video tile array stream 160 is greater than the number of video data streams added by DSP 140 to create video tile array stream 161.

The video tile array stream is displayed (214). For example, DAC 150 may convert video tile array stream 161 to an analog video signal that is displayed on display 170.

From the foregoing, it should be understood that the first and second DSPs split the work of creating a video tile stream.

This allows the video tiling system to perform additional functions and/or processing of video streams.

Figure 3:
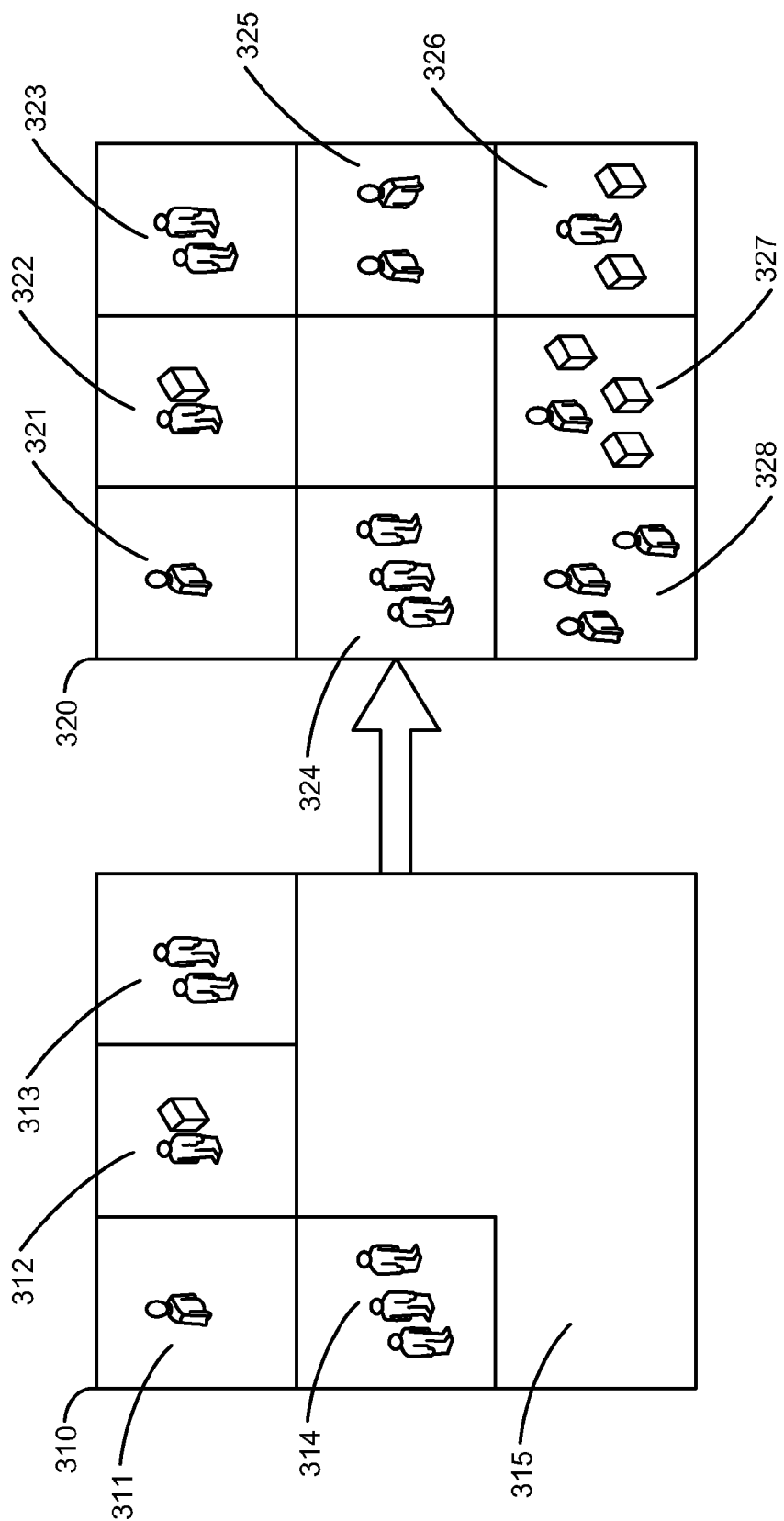
FIG. 3 illustrates a partial video tile array and a tiled video.

FIG. 3 illustrates a partial video tile array and a tiled video. In FIG. 3, partial video tile array 310 comprises video tiles 311-314 and unpopulated area 315. Partial video tile array 310 may be generated by DSP 130. Partial video tile array 310 may be transferred via partial video tile array stream 160.

Video tile 311 shows the torso of a person. Video tile 312 shows a person and a box. Video tile 313 shows two people. Video tile 314 shows three people. In an example, video tiles 311-314 may be the scaled versions of video data streams 121-124, respectively. Unpopulated area 315 is shown as black. Partial video tile array 310 is a partial video tile array because unpopulated area 315 has yet to be populated with additional video tiles.

Also shown in FIG. 3 is video tile array 320. Video tile array 320 comprises video tiles 321-328. Video tile array 320 may be generated by DSP 140. Video tile array 320 may be transferred via video tile array stream 161 to DAC 150.

Video tile 321 shows the torso of a person. Video tile 322 shows a person and a box. Video tile 323 shows two people. Video tile 324 shows three people. As can be seen from FIG. 3, video tiles 321-324 correspond to video tiles 311-314 in partial video tile 310.

When compared to partial video tile array 310, video tile array 320, has been populated with additional video tiles that partial video tile array 310 does not have. Video tile 325 shows the torsos of two people. Video tile 326 shows a person and two boxes. Video tile 327 shows a person and three boxes. Video tile 328 show the torsos of three people. Video tile array 320 is not a partial video tile array because unpopulated area 315 of partial video tile array 310 has been populated with video tiles 325-328. In an example, video tiles 325-328 may be the scaled versions of video data streams 125-128, respectively. In another example, the video area covered by video tiles 321-324 may have been received from a different DSP (e.g., DSP 130) via a partial video tile stream 160.

The methods, systems, devices, DSPs, video peripherals, processing system, video ADCs, and DAC described above may be implemented with, contain, or be executed by one or more computer systems. The methods described above may also be stored on a computer readable medium. Many of the elements of video tiling system 100 may be, comprise, or include computers systems. This includes, but is not limited to: analog video sources 101-108; video ADCs 111-118; DSP 130; DSP 140; DAC 150; VPs 131-135; VPs 141-146; and display 170. These computer systems are illustrated, by way of example, in FIG. 4.

Figure 4:
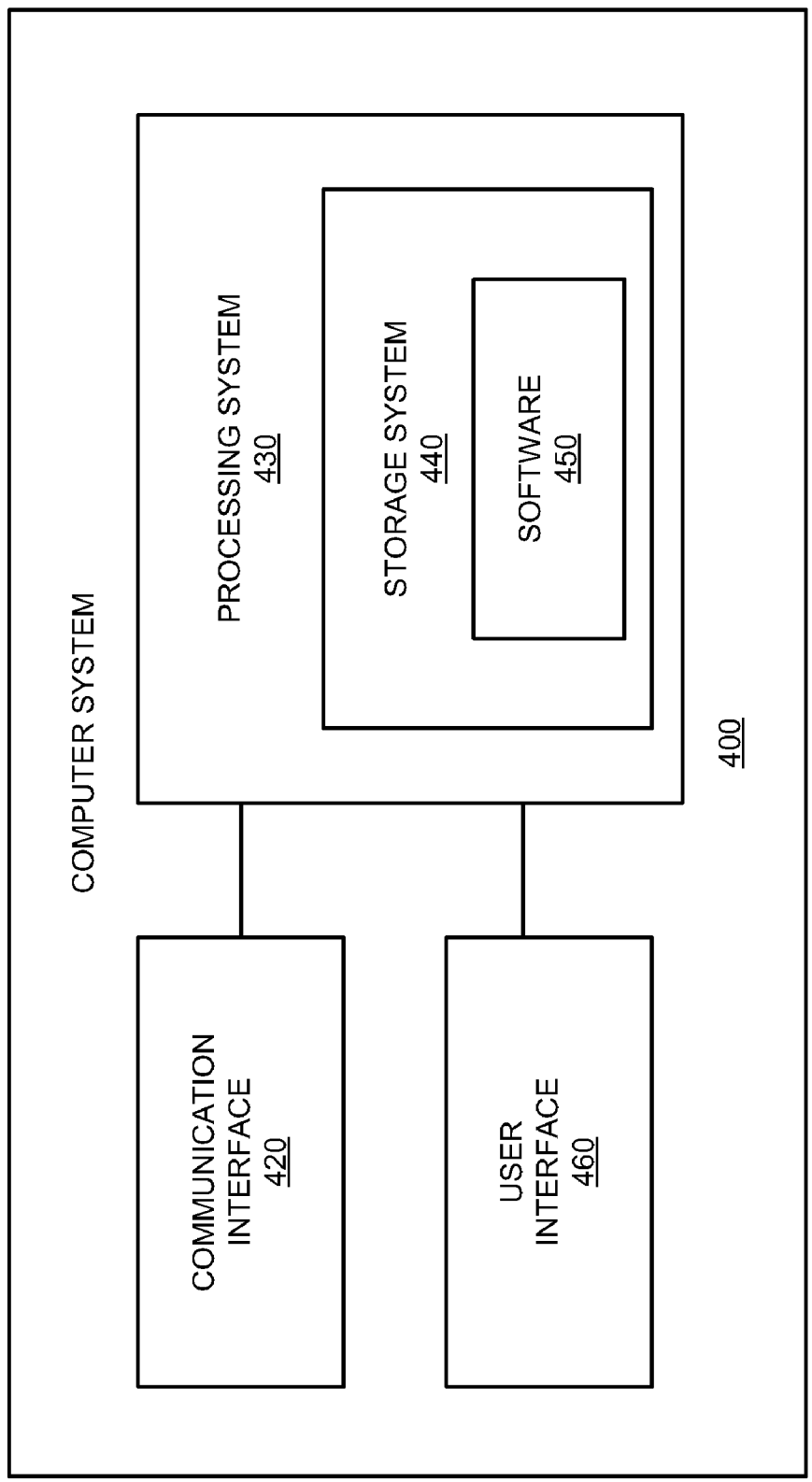
FIG. 4 is a block diagram illustrating a computer system.

FIG. 4 illustrates a block diagram of a computer system. Computer system 400 includes communication interface 420, processing system 430, and user interface 460. Processing system 430 includes storage system 440. Storage system 440 stores software 450. Processing system 430 is linked to communication interface 420 and user interface 460. Computer system 400 could be comprised of a programmed general-purpose computer, although those skilled in the art will appreciate that programmable or special purpose circuitry and equipment may be used. Computer system 400 may be distributed among multiple devices that together comprise elements 420-460.

Communication interface 420 could comprise a network interface, modem, port, transceiver, or some other communication device. Communication interface 420 may be distributed among multiple communication devices. Processing system 430 could comprise a computer microprocessor, logic circuit, or some other processing device. Processing system 430 may be distributed among multiple processing devices.

User interface 460 could comprise a keyboard, mouse, voice recognition interface, microphone and speakers, graphical display, touch screen, or some other type of user device. User interface 460 may be distributed among multiple user devices. Storage system 440 could comprise a disk, tape, integrated circuit, server, or some other memory device. Storage system 440 may be distributed among multiple memory devices.

Processing system 430 retrieves and executes software 450 from storage system 440. Software 450 may comprise an operating system, utilities, drivers, networking software, and other software typically loaded onto a computer system. Software 450 could comprise an application program, firmware, or some other form of machine-readable processing instructions. When executed by processing system 430, software 450 directs processing system 430 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video system, comprising:
   receiving a first plurality of video streams produced by a first plurality of Analog to Digital Converters (ADCs) into a first Digital Signal Processor (DSP);
   processing the first plurality of video streams to produce a partial video tile array stream;
   transferring the partial video tile array stream to a second DSP;
   receiving a second plurality of video streams produced by a second plurality of ADCs into the second DSP;
   processing the partial video tile array stream and the second plurality of video streams to generate a tiled video stream comprising a plurality of video tiles that each correspond to a one of the first and second plurality of video streams; and
   transferring the tiled video stream to a digital to analog converter (DAC).

2. The method of claim 1, wherein the partial video tile array stream comprises scaled down versions of said first plurality of video streams.

3. The method of claim 1, wherein the number of the first plurality of video streams is greater than the number of the second plurality of video streams.

4. The method of claim 1, wherein the step of processing the first plurality of video streams to produce the partial video tile array stream further comprises:
   scaling at least one of the first plurality of video streams into a scaled down version in the first DSP;
   arranging the scaled down version with a processed version of at least one of the first plurality of video streams into a partial video tile array in the first DSP; and
   producing the partial video tile array stream from the partial video tile array in the first DSP.

5. The method of claim 1, wherein at least one of the second plurality of video streams is scaled down in the second DSP to generate the tiled video stream.

6. The method of claim 5, wherein at least one of the first plurality of video streams is scaled down in the first DSP to generate the partial video tile array stream.

7. The method of claim 6, wherein the step of processing the partial video tile array stream and the second plurality of video streams further comprises:
- scaling at least one of the second plurality of video streams into a scaled down version in the second DSP;
- arranging the scaled down version with a processed version of at least one of the second plurality of video streams into a second partial video tile array in the second DSP; and
- producing the tiled video stream from the partial video tile array and the second partial video tile array in the second DSP.

8. A video processing system, comprising:
- a first plurality of video Analog to Digital Converters (video ADCs) converting a first plurality of analog video signals into a first plurality of digital video streams;
- a first Digital Signal Processor (DSP) that receives the first plurality of digital video streams and generates a partial video tile array stream from said plurality of digital video streams;
- a second plurality of video ADCs converting a second plurality of analog video signals into a second plurality of digital video streams; and
- a second DSP that receives the second plurality of digital video streams and generates a tiled video stream from said second plurality of digital video streams and said partial video tile array stream.

9. The video processing system of claim 8, wherein the partial video tile array stream comprises scaled down versions of said first plurality of digital video streams.

10. The video processing system of claim 8, wherein the number of the first plurality of video streams is greater than the number of the second plurality of video streams.

11. The video processing system of claim 8, wherein:
- the first DSP scales at least one of the first plurality of video streams into a scaled down version;
- and wherein the first DSP arranges the scaled down version with a processed version of at least one of the first plurality of video streams into a partial video tile array; and
- wherein the first DSP produces the partial video tile array stream from the partial video tile array.

12. The video processing system of claim 8, wherein at least one of the second plurality of video streams is scaled down in the second DSP to generate the tiled video stream.

13. The video processing system of claim 12, wherein at least one of the first plurality of video streams is scaled down in the first DSP to generate the partial video tile array stream.

14. The video processing system of claim 13 wherein:
- the second DSP scales at least one of the second plurality of video streams into a scaled down version in the second DSP;
- and wherein the second DSP arranges the scaled down version with a processed version of at least one of the second plurality of video streams into a second partial video tile array; and
- wherein the second DSP produces the tiled video stream from the partial video tile array and the second partial video tile array.

15. A non-transitory computer-readable medium comprising instructions stored thereon for operating a video processing system to create a tiled display of video streams, wherein the instructions, when executed by the video processing system, at least direct the video processing system to:
- receive a first plurality of video streams produced by a first plurality of Analog to Digital Converters (ADCs) into a first Digital Signal Processor (DSP);
- process the first plurality of video streams to produce a partial video tile array stream;
- transfer the partial video tile array stream to a second DSP;
- receive a second plurality of video streams produced by a second plurality of ADCs into the second DSP;
- process the partial video tile array stream and the second plurality of video streams to generate a tiled video stream comprising a plurality of video tiles that each correspond to a one of the first and second plurality of video streams; and
- transfer the tiled video stream to a digital to analog converter (DAC).

16. The computer readable medium of claim 14, wherein the partial video tile array stream comprises scaled down versions of said first plurality of video streams.

17. The computer readable medium of claim 14, wherein the number of the first plurality of video streams is greater than the number of the second plurality of video streams.

18. The computer readable medium of claim 14, wherein the instructions for the step of processing the first plurality of video streams to produce the partial video tile array stream further instruct the video processing system to:
- scale at least one of the first plurality of video streams into a scaled down version in the first DSP;
- arrange the scaled down version with a processed version of at least one of the first plurality of video streams into a partial video tile array in the first DSP;
- produce the partial video tile array stream from the partial video tile array in the first DSP.

19. The computer readable medium of claim 14, wherein at least one of the second plurality of video streams is scaled down in the second DSP to generate the tiled video stream.

20. The computer readable medium of claim 19, wherein at least one of the first plurality of video streams is scaled down in the first DSP to generate the partial video tile array stream.

21. The computer readable medium of claim 20, wherein the instructions for the step of processing the partial video tile array stream and the second plurality of video streams to generate a tiled video stream further instruct the video processing system to:
- scale at least one of the second plurality of video streams into a scaled down version in the second DSP;
- arrange the scaled down version with a processed version of at least one of the second plurality of video streams into a second partial video tile array in the second DSP;
- produce the tiled video stream from the partial video tile array and the second partial video tile array in the second DSP.

* * * * *